United States Patent
Fan

(10) Patent No.: US 9,800,068 B2
(45) Date of Patent: Oct. 24, 2017

(54) PORTABLE CHARGER WITH AUXILIARY FUNCTIONS

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 185 days.

(21) Appl. No.: 14/983,066

(22) Filed: Dec. 29, 2015

(65) Prior Publication Data
US 2017/0187211 A1   Jun. 29, 2017

(51) Int. Cl.
*H02J 7/00* (2006.01)
*H04B 1/3883* (2015.01)
*H04B 1/3827* (2015.01)

(52) U.S. Cl.
CPC .......... *H02J 7/0044* (2013.01); *H04B 1/385* (2013.01); *H04B 1/3883* (2013.01)

(58) Field of Classification Search
CPC .................................................. H02J 7/0044
USPC ....................................................... 320/115
See application file for complete search history.

(56) References Cited

U.S. PATENT DOCUMENTS

| | | | |
|---|---|---|---|
| 7,016,708 B1 * | 3/2006 | Chan ................... | B60R 11/0247 381/389 |
| 8,076,902 B2 * | 12/2011 | Sip ....................... | H02J 7/0044 320/107 |
| 8,963,498 B2 * | 2/2015 | Ferguson ............... | B65H 75/48 320/107 |

* cited by examiner

*Primary Examiner* — M'Baye Diao
(74) *Attorney, Agent, or Firm* — Rabin & Berdo, P.C.

(57) ABSTRACT

A portable charger includes a carrier seat formed with one first clamping piece; an electrical power source installed within the carrier seat, and exposing partially from the carrier seat; a sliding seat mounted slidably on the carrier seat and formed with one second clamping piece; and a resilient strap having one portion attached to the carrier seat and a remaining portion straddling over the sliding seat such that sliding movement of the sliding seat away from the carrier seat against a restoration force of the resilient strap can vary a distance between the first and second clamping pieces such that the first and second clamping pieces can resiliently clamp two opposite ends of a mobile phone disposed between the first and second clamping pieces by virtue of the restoration force.

5 Claims, 6 Drawing Sheets

PORTABLE CHARGER WITH AUXILIARY FUNCTIONS

BACKGROUND OF THE INVENTION

1. Field of the Invention

The present invention relates to technological field of a portable charger, more particularly to a portable charger that is capable of fixing a mobile phone thereon so as to facilitate the user for continuing the application of the mobile phone.

2. The Prior Arts

Advance of electronic technology puts a mobile phone in prevalence so that the people of modern world to possess one mobile phone individually. The more the application programs are configured in the mobile phone, the easier for the people to carry the mobile phone along with them so as to connect with far-away communication tools or the mobile phone is activated for serving as media player, game player and satellite navigation device. The more the auxiliary functions are configured in a mobile phone possesses, the quicker the battery power runs out and hence the mobile phone needs frequent charging. Under this condition, each mobile user is required to prepare a portable charger for charging the mobile phone whenever circumstances demand. A conventional portable charger has an external connection wire provided with a plug that is adapted to be inserted into the mobile phone for charging the latter such that during the charging process, the mobile phone and the conventional portable charger are not secured relative to each other. In the event the mobile phone and the conventional portable charger charging the mobile phone are put into a bag carried along by the user, the connection wire may entangle with some articles in the bag due to its relative length, thereby rendering disengagement of the plug from the mobile phone and hence interrupting the charging process. During the charging process and in case the user requires to use the mobile phone, the length of the connection wire restricts the handling range of the mobile phone. The user is unable to move the mobile phone flexibly or move the mobile phone to a place wherever he wishes.

SUMMARY OF THE INVENTION

Therefore, the primary objective of the present invention is to provide a portable charger that possesses simple structure with clamping functions such that during the charging procession, a mobile phone being charged can be mounted on the portable charger such that the user can handle the mobile phone independently without any restriction during the charging procession.

Another objective of the present invention is to provide a portable charger having a clamping function with simple structure and in which an rectangle battery is aggregated with the thin and simple clamping structure such that the portable charger has a relatively small overall thickness so that the user does not feel discomfort due to its weight during application of the mobile phone.

A portable charger according to the present invention includes a carrier seat formed with at least one first clamping piece projecting upwardly therefrom; an electrical power source installed within the carrier seat, including a battery unit and an electrical connector coupled electrically with the battery unit and exposing at least partially from the carrier seat; a sliding seat mounted on the carrier seat and slidable along a longitudinal length of the carrier seat, having a carrier surface that is adapted to permit seating of a mobile phone thereon and that is formed with at least one second clamping; piece in alignment with the first clamping piece such that sliding movement of the sliding seat relative to the carrier seat can vary a distance between the first and second clamping pieces, the sliding seat further having at least one lateral side wall covering an outer peripheral wall of the carrier seat; and a resilient strap having at least one portion attached to the carrier seat and a remaining portion straddling over the lateral side wall of the sliding seat such that sliding movement of the sliding seat away from the carrier seat against a restoration force of the resilient strap can vary the distance between the first and second clamping pieces and once a mobile phone is seated on the carrier surface, the first and second clamping pieces resiliently clamp two opposite ends of the mobile phone therebetween by virtue of the restoration force of the resilient strap.

In the portable charger of the present invention, the sliding seat is configured as a single layer installed on the carrier seat while the resilient strap is straddling around an outer peripheral wall of the sliding seat constituted by three lateral walls to create the restoration force for resiliently coupling the sliding seat and the carrier seat together and simultaneously providing a clamping force and reducing the overall thickness of the portable charger regardless of stacking of the sliding seat over the carrier seat. During the charging procession, though the mobile phone is seated securely between first and second clamping pieces of the portable charger, the user can manipulate has mobile phone conveniently and independently without any restriction.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENT

Figure 1:
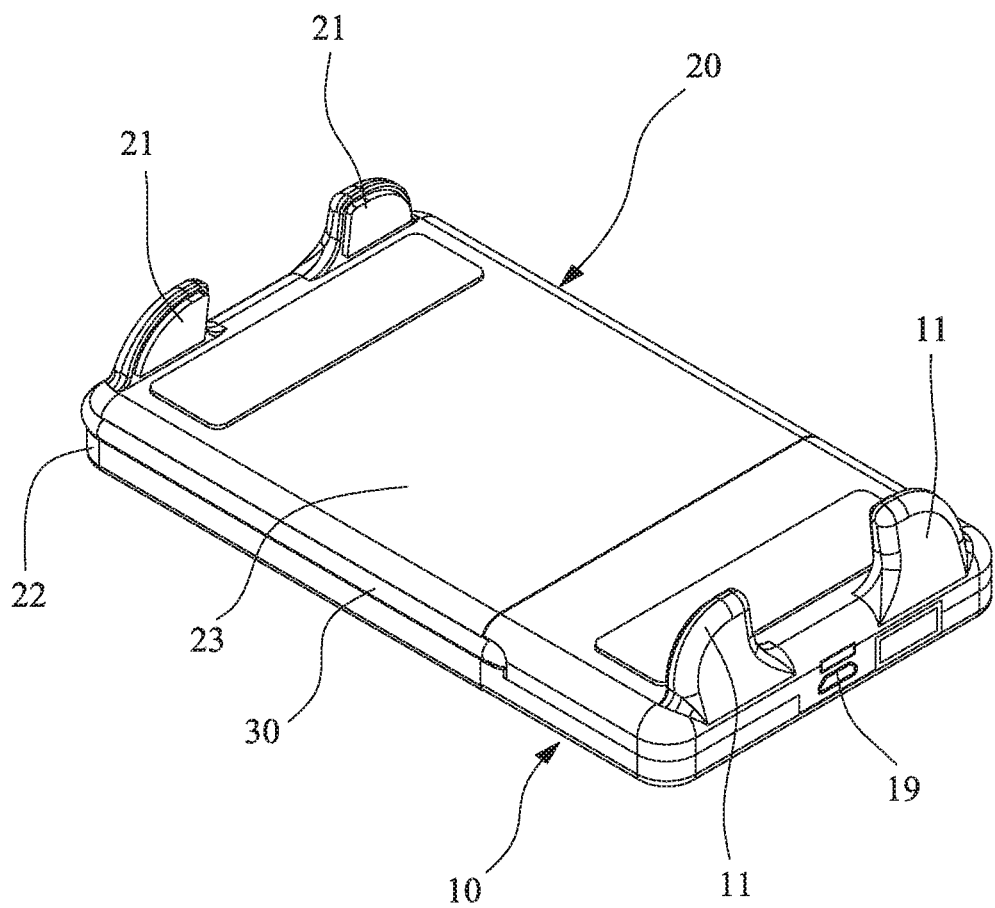
FIG. 1 shows a perspective view of a portable charger of the present with auxiliary functions.
Figure 2:
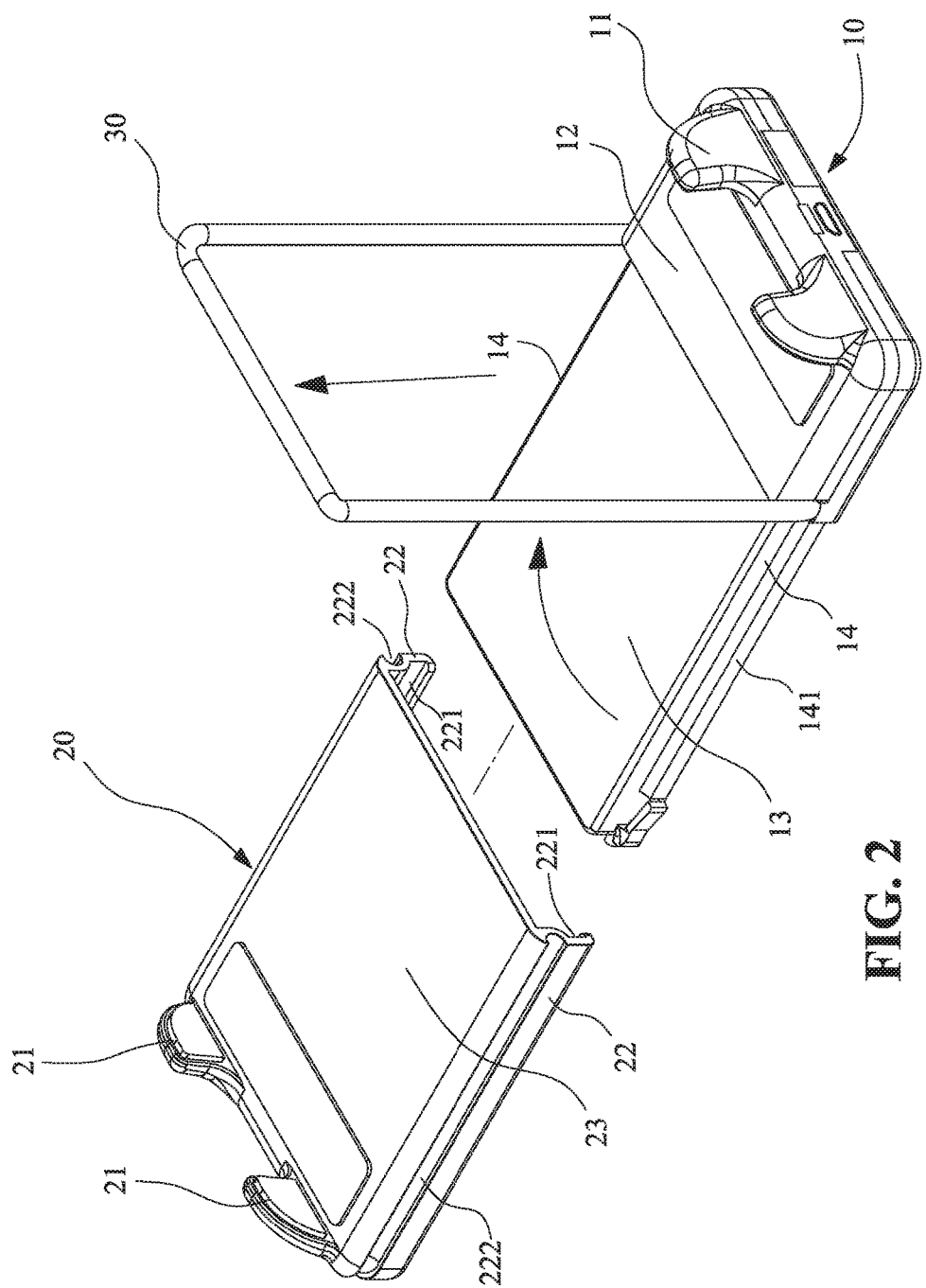
FIG. 2 shows an exploded and perspective view of the portable charger of the present invention.

Referring to FIGS. 1 and 2, wherein FIG. 1 shows a perspective view of a portable charger of the present with auxiliary functions and FIG. 2 shows an exploded and perspective view of the portable charger of the present. A portable charger of the present invention accordingly includes a carrier seat 10, an electrical power source 40, a sliding seat 20 and a resilient strap 30, wherein the electrical power source 40 is installed within the carrier seat 11. To be more specific, a storage battery serves as the electrical power source 40 in the present invention. The sliding seat 20 is mounted on the carrier seat 10 and is slidable along a longitudinal length of the carrier seat 10. The carrier seat 10 is formed with at least one first clamping piece 11 projecting upwardly therefrom. The sliding seat 20 is formed with at least one second clamping piece 21 in alignment with the first clamping piece 11. The resilient strap 30 has at least one portion attached to the carrier seat 10 and a remaining portion straddling over an outer peripheral wall of the sliding seat 20 such that when an applied external force is greater than a restoration force of the resilient strap 30, the second clamping piece 21 can be moved away from the first clamping piece 11 and upon removal of the applied external force, the first and second clamping pieces 11, 21 resiliently clamp two opposite ends of a mobile phone therebetween by virtue of the restoration force if the mobile phone is disposed between the first and second clamping pieces 11, 21.

As shown in FIG. 2, the carrier seat 10 has a first elevation portion 12 and a second elevation portion 13 located at an elevation lower than the first elevation portion 12. In this embodiment, the sliding seat 20 is mounted slidably on the second elevation portion 13, wherein the first clamping piece 11 projects upwardly from the first elevation portion 12 in alignment with the second clamping piece 21 of the sliding seat 20. Preferably, there are two first clamping pieces 11 and two second clamping pieces 21. In addition, the second elevation portion 13 of the carrier seat 10 has two opposite side walls 14 extending parallelly in a sliding direction of the sliding seat 20 with respect to the carrier seat 10. Each of the opposite side walls 14 is formed with a slide rail 141.

Figure 3:
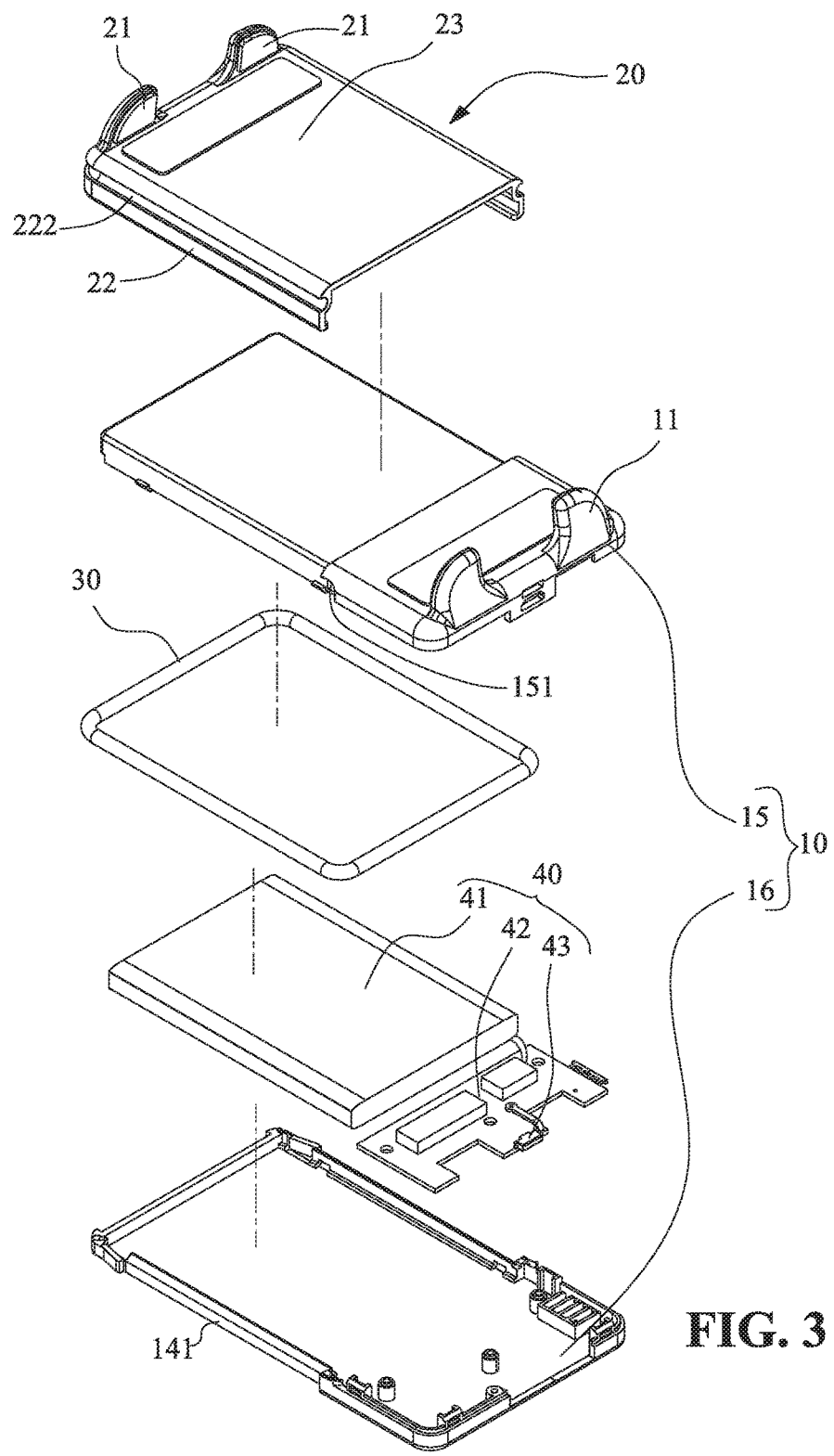
FIG. 3 shows a detailed exploded view of the portable charger of the present invention.

The carrier seat 10 can be one-piece integral member or can be composed of several parts. Only one type will be used for explanation in this embodiment. As shown in FIG. 3, the carrier seat 10 includes an upper carrier body 15 and a lower carrier body 16 coupled to the upper carrier body 15 in such a manner to define a receiving space therebetween. The electrical power source 40 is seated in the receiving space, includes a battery unit 41, a control circuit board 42 and an electrical connector 43. The battery unit 41 is generally flat or rectangle in order to reduce an overall thickness thereof. The battery unit 41, the control circuit board 42 and the electrical connector 43 are coupled electrically relative to one another in order to supply the electrical power for performing the battery charging procession. The electrical connector 43 has a USB port 19 (either A-type or B-type) exposing at least partially from the carrier seat 10 such that a USB connector of A or B type can be implemented in the event of charging a mobile phone seated on the portable charger of the present invention (see FIG. 6). In this embodiment, the carrier seat 10 can be fabricated from plastic materials through injection molding. The injection molding is to encapsulate the battery unit 41, the control circuit board 42 and the electrical connector 43 between the upper and lower carrier bodies 15, 16 of the carrier seat 10 except exposing the USB port 19 from the carrier seat 10. Of course, the electrical power source 40 may further includes a torch and on-and-off switch or other functions, a detailed thereof is omitted herein for the sake of brevity.

The sliding seat 20 is mounted on the carrier seat 10 and is slidable along a longitudinal length of the carrier seat 10. The sliding seat 20 is a rectangle cover body enclosing an outer peripheral wall the second elevation portion 13 of the carrier seat 10. After mounting of the sliding seat 20 over the second elevation portion 13, the sliding seat 20 and the first elevation portion 12 form a rectangle configuration. The sliding seat 20 further has three lateral side walls 22, two of which have two opposite inner side surfaces facing the opposite side walls 14 of the second elevation portion 13 and defining two sliding channel 221 for receiving slidably the two slide rails 141 of the second elevation portion 13 once the sliding seat 20 is mounted slidably on the second elevation portion 13. The sliding seat 20 further has a carrier surface 23 from which the two second clamping pieces 21 project upwardly to be aligned with two first clamping pieces 11 projecting upwardly from the first elevation portion 12 of the carrier seat 10 such that sliding movement of the sliding seat 20 relative to the carrier seat 10 can vary a distance between the first and second clamping pieces 11, 21, Note that an exposing outer side surface of the sliding seat 20 constituted by three lateral side walls 22 is formed with a retention groove 222, the purpose of which will be described in the following.

Figure 4:
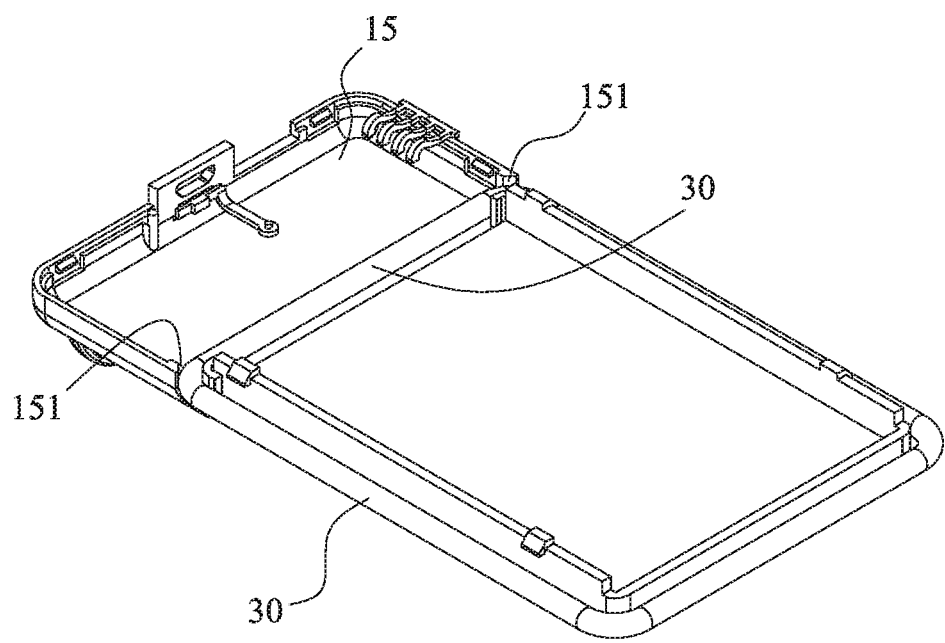
FIG. 4 shows a carrier seat and a resilient strap employed in the portable charger of the present invention.

The resilient strap 30 in fact is a resilient ring having the restoration force to retain its initial shape due to being fabricated from rubber or elastic materials upon removal of an applied external force therefrom. The resilient strap 30 has two opposite portions respectively retained on the sliding seat 20 and the carrier seat 10. Referring to FIGS. 3 and 4, in order to facilitate the mounting, the resilient strap 30 is circular shaped, has one portion retained in an engagement groove 151 formed in the upper carrier body 15 of the carrier seat 10 and a remaining portion straddling over and is retained in the retention groove 222 formed on the exposing outer side surface of the sliding seat 20 such that the sliding seat 20 and the carrier seat 10 are resiliently coupled relative to each other. Note that the exposing outer side surface is constituted by three lateral side walls 22.

Figure 5:
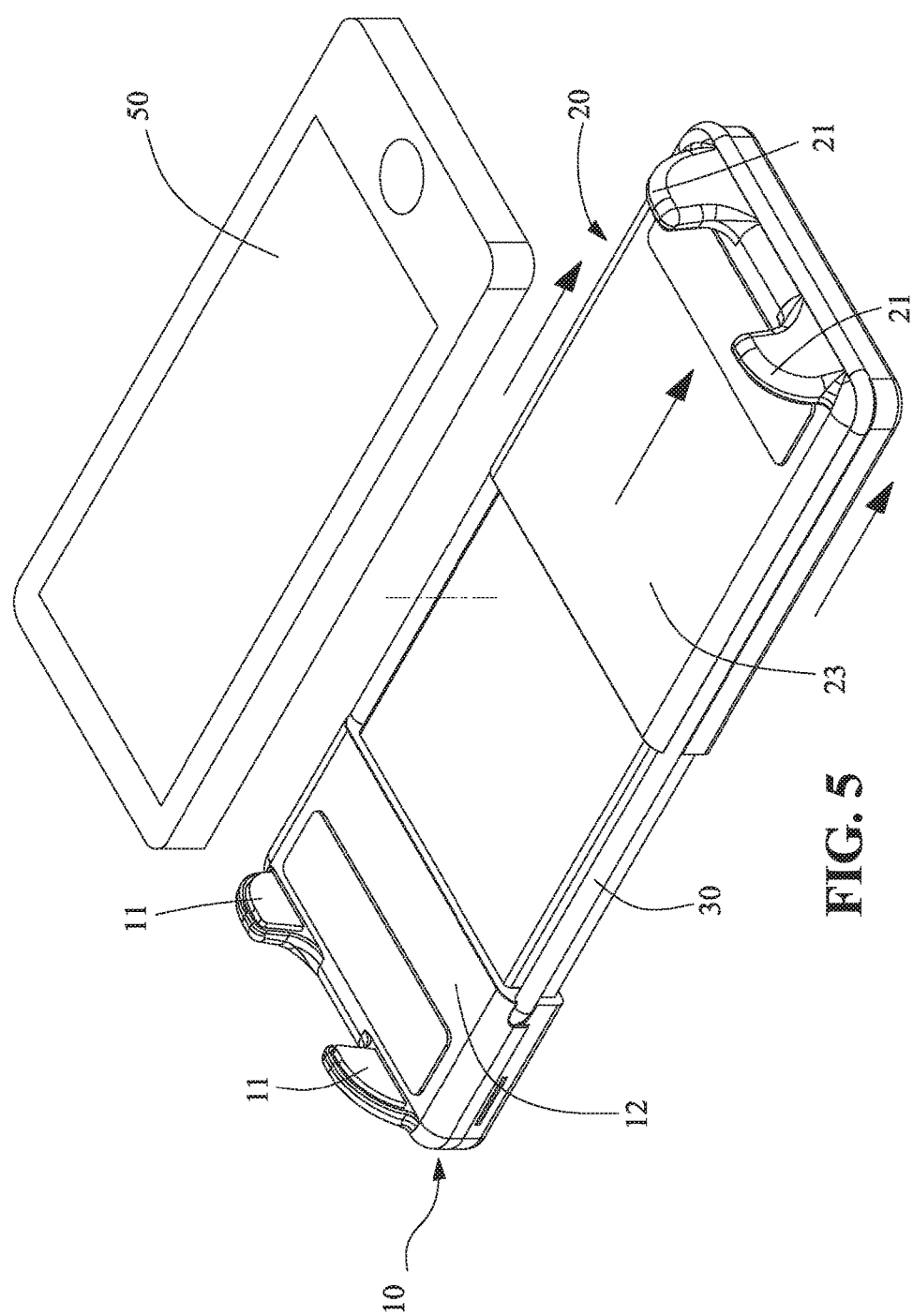
FIG. 5 illustrates how a mobile phone is seated on the portable charger of the present invention for undergoing battery charging procession.
Figure 6:
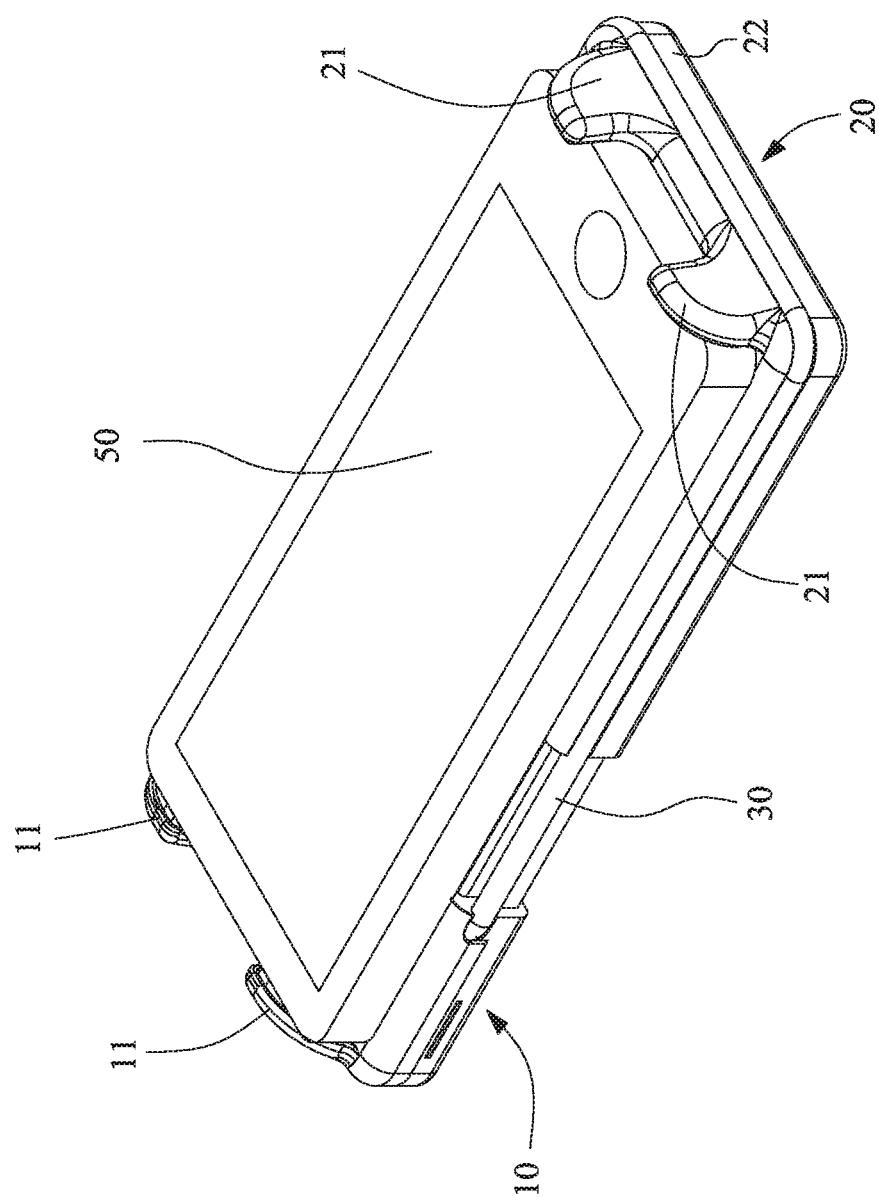
FIG. 6 is a perspective view illustrating a mobile phone is seated on the portable charger of the present invention during the battery charging procession.

Referring to FIGS. 5 and 6, when a mobile phone user wishes to charge his mobile phone, he only needs to pull the sliding seat 20 away from the first clamping pieces 11 against the restoration force the resilient strap 30, and after which he can seat his mobile phone 50 on the carrier surface 23 such the first and second clamping pieces 11, 21 cooperatively and resiliently clamp two opposite ends of the mobile phone therebetween upon removing the pulling force, as best shown in FIG. 6. At this time, one USB A-type or B-type connector (not visible) is used for connecting the mobile phone 5 and the portable charger of the present invention in order to charge the mobile phone 5.

One distinct feature resides in that the using range of the mobile phone 5 being charged by the portable charger of the present invention is not restricted by the USB connector regardless of its long or short length since the same can not entangle with any nearby objects. In addition, since the mobile phone 5 being charged by the portable charger of the present invention is fastened together, the user can handle the mobile phone independently without any restriction during the charging procession.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A portable charger comprising:
a carrier seat formed with at least one first clamping piece projecting upwardly therefrom;
an electrical power source installed within the carrier seat, including a battery unit and an electrical connector coupled electrically with the battery unit and exposing at least partially from the carrier seat;
a sliding seat mounted on the carrier seat and slidable along a longitudinal length of the carrier seat, having a carrier surface that is adapted to permit seating of a mobile phone thereon and that is formed with at least one second clamping piece in alignment with the first clamping piece such that sliding movement of the sliding seat relative to the carrier seat can vary a distance between the first and second clamping pieces, the sliding seat further having at least one lateral side wall covering an external peripheral wall of the carrier seat; and a resilient strap having at least one portion attached to the carrier seat and a remaining portion straddling over the lateral side wall of the sliding seat such that sliding movement of the sliding seat away from the carrier seat against a restoration force of the resilient strap can vary the distance between the first and second clamping pieces, and once the mobile phone is seated on the carrier surface, the first and second clamping pieces resiliently clamp two opposite ends of the mobile phone between by virtue of the restoration force of the resilient strap.

2. The portable charger according to claim 1, wherein the carrier seat has two opposite side walls extending parallelly in a sliding direction of the sliding seat, each of the opposite side walls being formed with a slide rail, the sliding seat having three of the lateral side walls, two of which have two opposite inner side surfaces facing the opposite side walls of the carrier seat and defining at least one sliding channel for receiving slidably one of the slide rails of the sliding seat 20 when the sliding seat is mounted slidably on the carrier seat.

3. The portable charger according to claim 1, wherein the carrier seat has a first elevation portion and a second elevation portion located at an elevation lower than the first elevation portion, the sliding seat being mounted slidably on the second elevation portion, the sliding seat having three of the lateral side walls enclosing an outer peripheral wall of the second elevation portion, wherein the first clamping piece projecting upwardly from the first elevation portion in alignment with the second clamping piece of the sliding seat.

4. The portable charger according to claim 1, wherein the sliding seat has an exposing outer side surface formed with a retention groove for retaining the resilient strap.

5. The portable phone charger according to claim 4, wherein the resilient strap is circular in shape, the carrier seat having an engagement groove for retaining the at least one portion of the resilient strap while the remaining portion of the resilient strap surrounds and is disposed in the retention groove of the sliding seat, thereby resiliently coupling the sliding seat and the carrier seat together by virtue of the restoration force.

* * * * *